(12) United States Patent
Jiang et al.

(10) Patent No.: US 8,148,998 B2
(45) Date of Patent: *Apr. 3, 2012

(54) ORIENTATION DETECTION CIRCUIT AND ELECTRONIC DEVICE USING THE SAME

(75) Inventors: Wan-Jun Jiang, Shenzhen (CN); Gang Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 385 days.

This patent is subject to a terminal disclaimer.

(21) Appl. No.: 12/547,450

(22) Filed: Aug. 25, 2009

(65) Prior Publication Data
US 2010/0148852 A1    Jun. 17, 2010

(30) Foreign Application Priority Data

Dec. 17, 2008 (CN) .......................... 2008 1 0306314

(51) Int. Cl.
*G01R 31/02* (2006.01)
(52) U.S. Cl. ...................................................... 324/537
(58) Field of Classification Search ........................ None
See application file for complete search history.

(56) References Cited

U.S. PATENT DOCUMENTS

| | | | |
|---|---|---|---|
| 7,999,789 B2* | 8/2011 | Ha et al. ........................ | 345/156 |
| 2003/0055597 A1* | 3/2003 | Berndorfer .................. | 702/150 |
| 2008/0228432 A1* | 9/2008 | Ha et al. ........................ | 702/150 |
| 2010/0148807 A1* | 6/2010 | Jiang et al. .................... | 324/697 |

* cited by examiner

*Primary Examiner* — Jermele M Hollington
(74) *Attorney, Agent, or Firm* — Altis Law Group, Inc.

(57) ABSTRACT

An orientation detection circuit is provided. The circuit includes a processor, a first resistor, a second resistor, a third resistor, a vibration switch, a first transistor, and a second transistor. The processor includes a first input pin and a second input pin. The third resistor has a resistance value greater than that of the first resistor and the third resistor. The vibration switch includes a first terminal being grounded, a second terminal connected to the second input pin, a third terminal connected to a power source, and a fourth terminal connected via the third resistor to the second terminal and connected to the first input pin. The first transistor has a first source connected via the first resistor to the power source, a first drain connected to the first input pin, and a first gate connected to the second input pin.

11 Claims, 7 Drawing Sheets

| Pin IO1 | Pin IO2 | Control signal |
|---|---|---|
| Low level | Low level | S1 |
| Low level | High level | S2 |
| High level | Low level | S3 |
| High level | High level | S4 |

FIG. 6

ORIENTATION DETECTION CIRCUIT AND ELECTRONIC DEVICE USING THE SAME

BACKGROUND

1. Technical Field

The present disclosure relates to orientation detection circuits, and more particularly, to an orientation detection circuit capable of detecting four placement orientations of devices utilizing the circuit.

2. Description of Related Art

FIG. 7 shows an orientation detection circuit 10. The circuit 10 includes a vibration switch K1, a processor U1, a first resistor R1, and a second resistor R2. The vibration switch K1 includes a first terminal 11, a second terminal 12, a third terminal 13, a fourth terminal 14, and a metal ball 15. The processor U1 includes a first input pin IO1 and a second input pin IO2.

The terminal 11 is connected to the pin IO1 and connected via the resistor R1 to a power source. The terminal 12 is connected to the pin IO2 and connected via the resistor R2 to the power source. The terminals 13 and 14 are grounded. When the ball 15 contacts two of the four terminals 11, 12, 13, and 14, the processor U1 can obtain input states of "11", "10", and "01", which corresponds to three different orientations of the switch K1. In other words, the circuit 10 can be used to detect three placement orientations of a device that utilizes the circuit 10.

However, in some circumstances, devices can be placed in any of four orientations and it may be desirable to be able to detect the four orientations.

BRIEF DESCRIPTION OF THE DRAWINGS

The components in the drawings are not necessarily drawn to scale, the emphasis instead being placed upon clearly illustrating the principles of the orientation detection circuit. Moreover, in the drawings, like reference numerals designate corresponding parts throughout the several views.

FIG. 6 shows an exemplary relationship table stored in the orientation detection circuit of FIG. 1.

DETAILED DESCRIPTION

Figure 1:
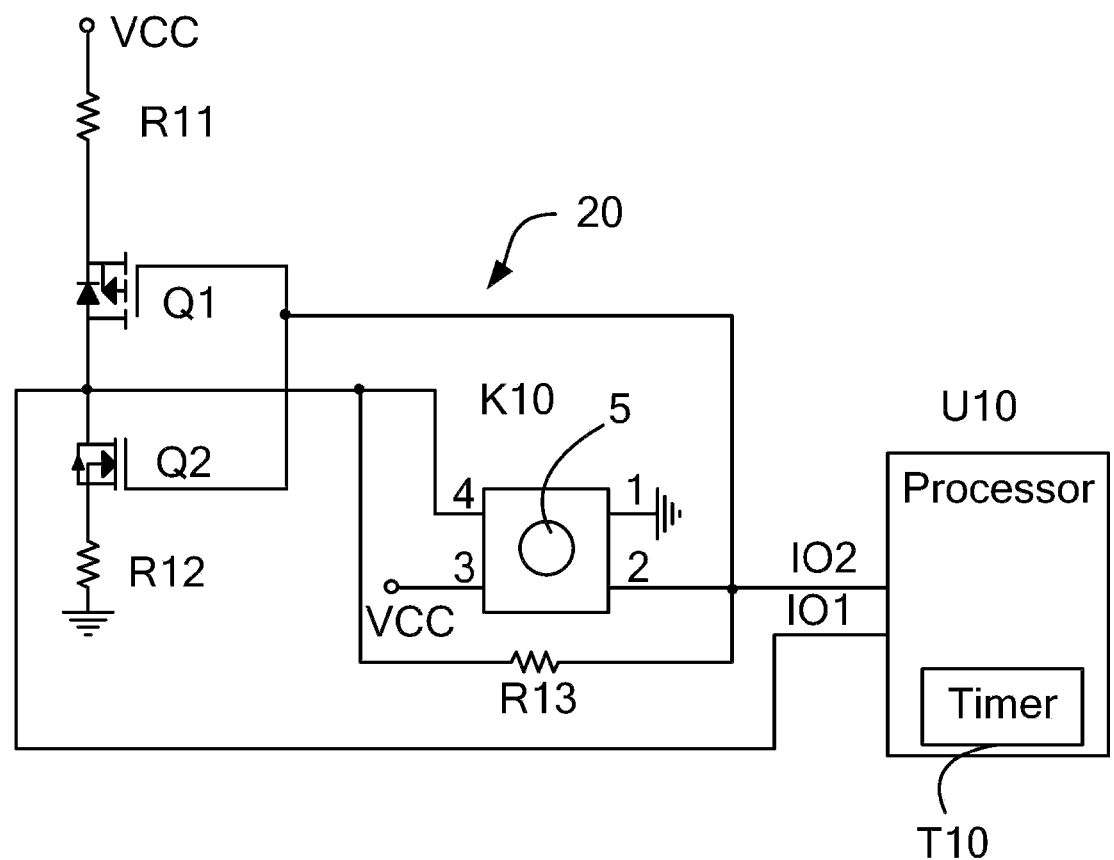
FIG. 1 is a circuit diagram of an orientation detection circuit in accordance with an exemplary embodiment.

FIG. 1 shows a hardware infrastructure of an orientation detection circuit 20 in accordance with an exemplary embodiment. The circuit 20 includes a vibration switch K10, a processor U10, a first resistor R11, a second resistor R12, a third resistor R13, a first transistor Q1, and a second resistor Q2.

The processor U10 includes a first input pin IO1 and a second input pin IO2. In the exemplary embodiment, the pins IO1 and IO2 are set to a high impedance state. The resistor R13 has a resistance value that is much greater than that of the resistor R11 and R12. For example, the resistance value of R11 and R12 may be 10 k ohms, and the resistance value of R11 may be 100 k ohms. The resistor R13 is connected between a node N10 and a node N20.

In this embodiment, the transistor Q1 can be a p-channel enhancement-mode MOSFET, and the transistor Q2 can be a n-channel depletion-mode MOSFET. In other embodiment, the transistors Q1 and Q2 may be junction FETs.

The vibration switch K10 includes a first terminal 1, a second terminal 2, a third terminal 3, a fourth terminal 4, and a metal ball 5. The terminal 1 is grounded. The terminal 2 is connected to the node N10. The terminal 3 is connected to a power source VCC. The terminal 4 is connected to the node N20.

The transistor Q1 has a first drain, a first source, and a first gate. The first drain is connected to the pin IO1 and terminal 4, and is connected to the pin IO2 via the resistor R13. The first source is connected via the resistor R11 to the power source VCC. The first gate is connected to the pin IO2.

The transistor Q2 has a second drain, a second source, and a second gate. The second drain is connected to the pin IO1 and terminal 4, and is connected to the pin IO2 via the resistor R13. The second source is grounded via the resistor R12. The second gate is connected to the pin IO2.

Figure 2:
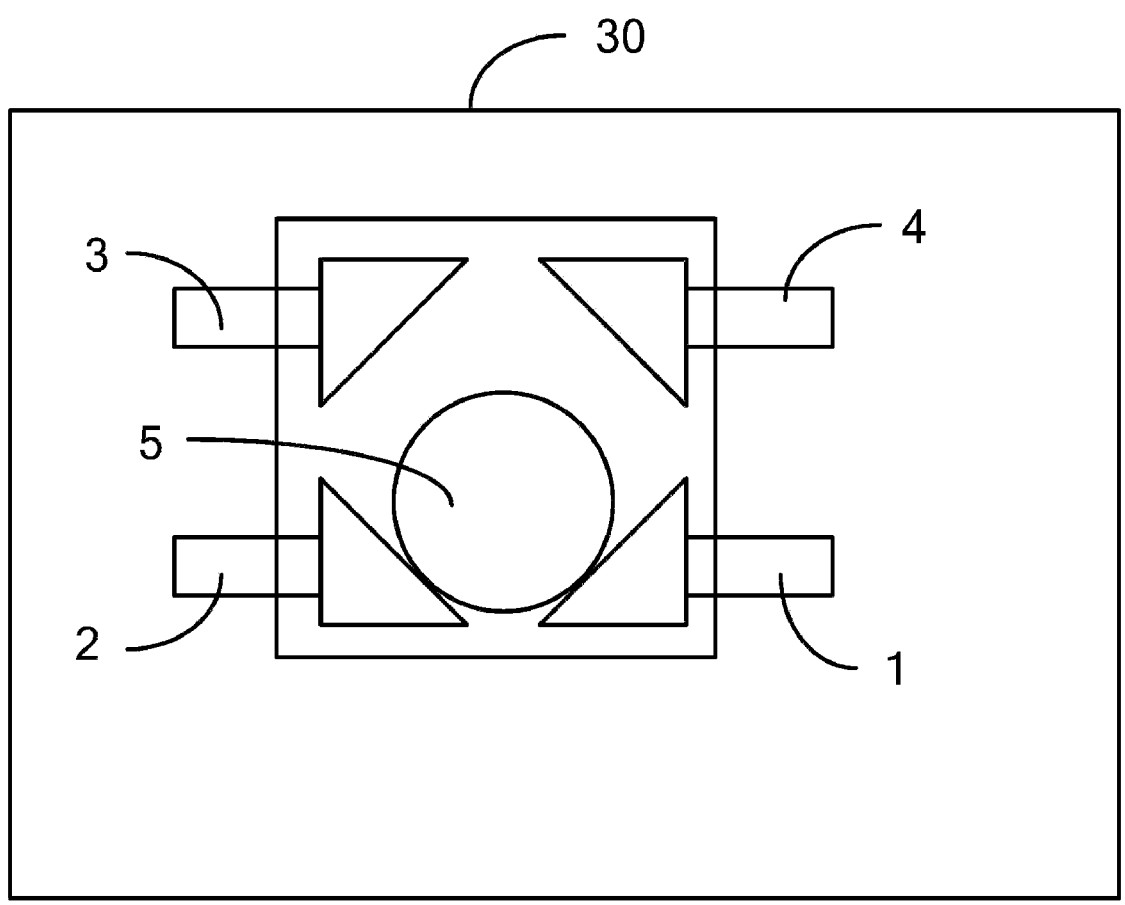
FIG. 2 illustrates an electronic device utilizing the orientation detection circuit of FIG. 1, which is placed in a first orientation.
Figure 3:
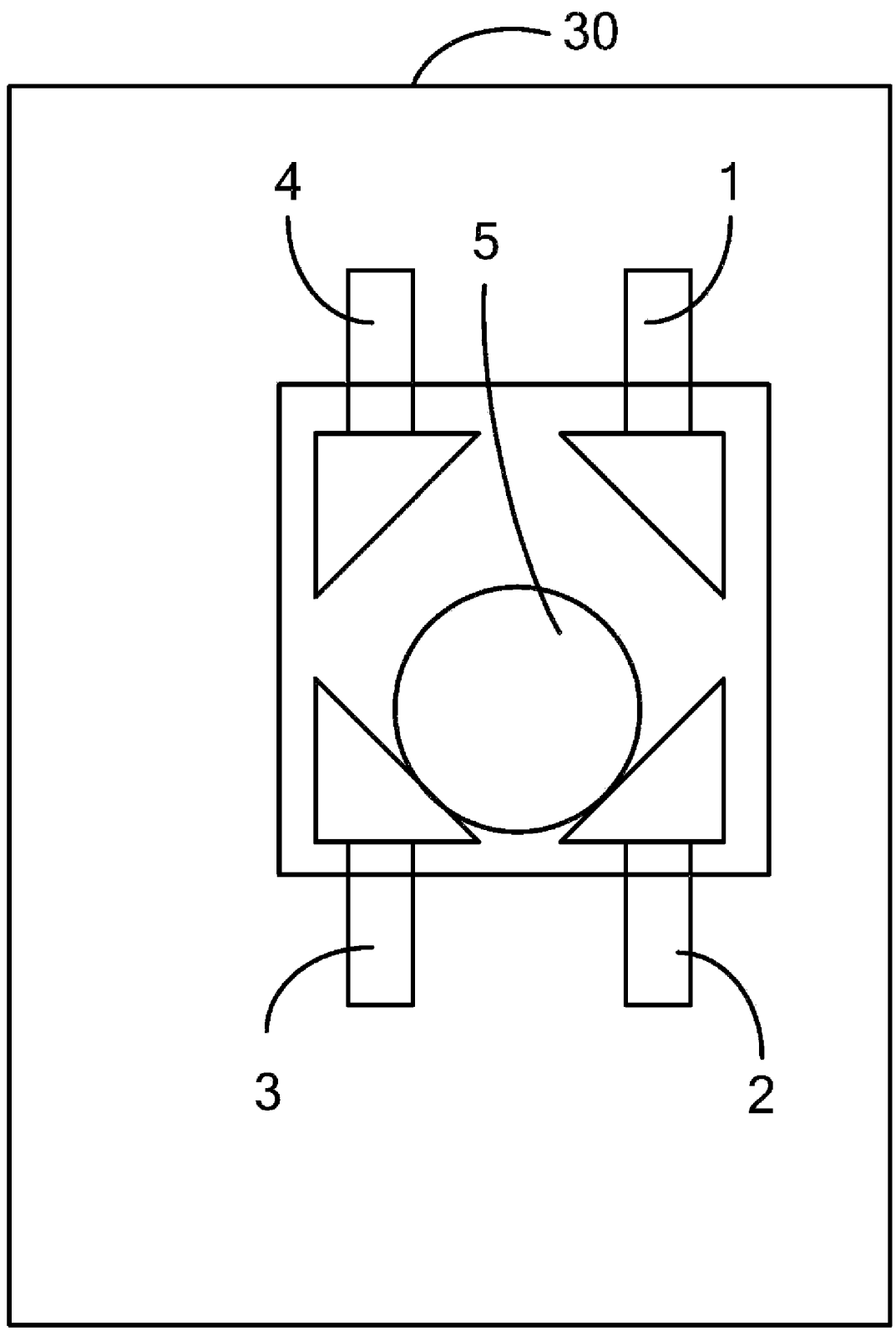
FIG. 3 illustrates the electronic device of FIG. 2 that is placed in a second orientation.

Referring to FIGS. 2 to 5, in one embodiment, the circuit 20 is used in a digital photo frame 30. As shown in FIG. 2, the digital photo frame 30 is placed in a first orientation. In this circumstance, the metal ball 5 contacts the terminals 1 and 2 and the terminal 2 is thus grounded. The pin IO2 connected to the terminal 2 goes to low level.

The first gate and the second gate connected to the pin IO2 go to low level, and the transistor Q1 thus turns on and the transistor Q2 turns off. As a result, the resistors R11 and R13 are connected in series between the power source VCC and the ground. Because the resistance value of resistor R13 is much greater than that of the resistor R11, the pin IO1 changes to high level. Accordingly, when the digital photo frame 30 is placed in the first orientation, the input signals of the pins IO1 and IO2 are at high level and low level, respectively.

As shown in FIG. 2, the digital photo frame 30 is placed in a second orientation. In this circumstance, the metal ball 5 contacts the terminals 2 and 3. The terminal 3 is thus connected to the power source VCC and the input signal of the pin IO2 is thus turned to high level. The first gate and the second gate connected to the pin IO2 change to high level.

The transistor Q1 thus turns off and the transistor Q2 turns on. The resistors R12 and R13 are connected in series between the power source VCC and the ground. Because the resistance value of resistor R13 is much greater than that of the resistor R12, the input signal of the pin IO1 is at low level. Accordingly, when the digital photo frame 30 is placed in the second orientation, the input signals of the pins IO1 and IO2 are at low level and high level, respectively.

Figure 4:
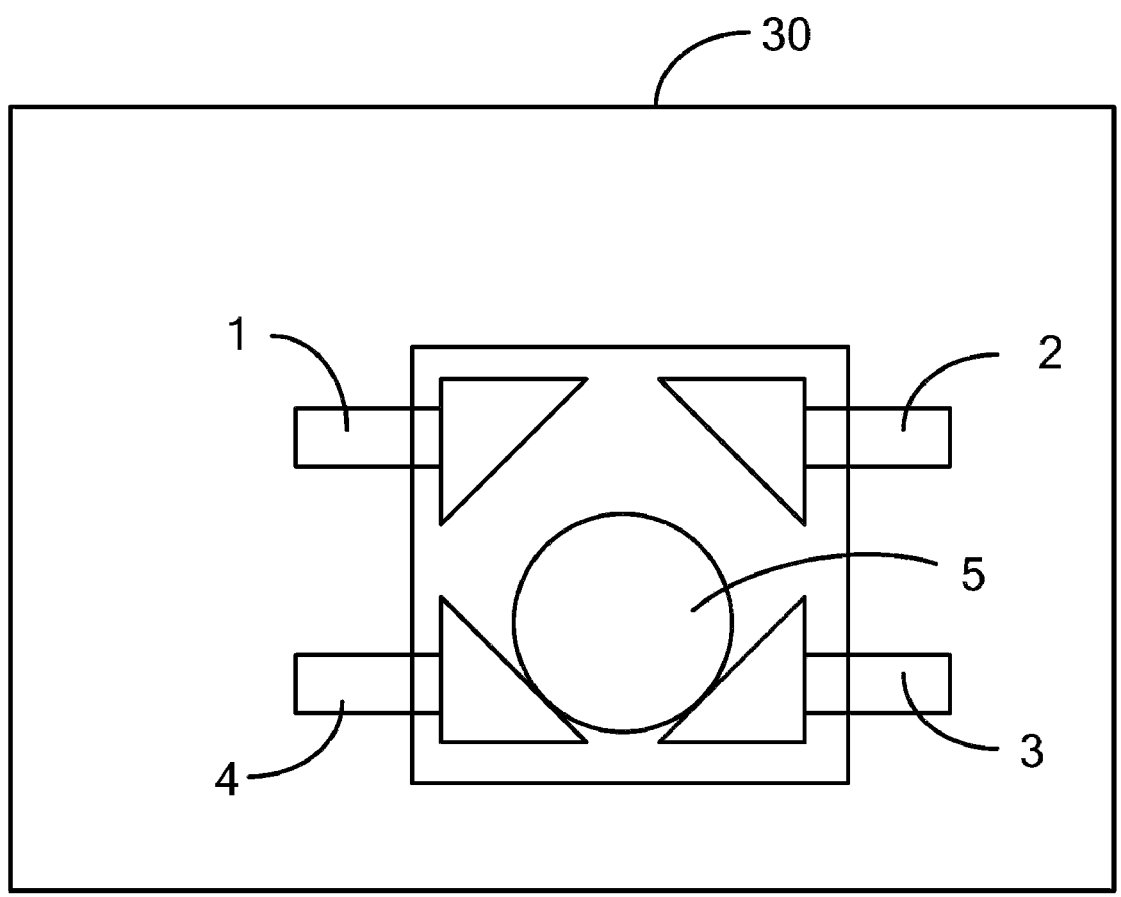
FIG. 4 illustrates the electronic device of FIG. 2 that is placed in a third orientation.

As shown in FIG. 4, the digital photo frame 30 is placed in a third orientation. In this circumstance, the metal ball 5 contacts the terminals 3 and 4. The terminal 4 is thus connected to the power source VCC that turns the pin IO1 to high level. The pin IO2 is connected to the power source VCC via the resistor R13. Because the pin IO2 is at high impedance state, the pin IO2 is turned to high level. Accordingly, when the digital photo frame 30 is placed in the third orientation, the input signals of the pins IO1 and IO2 are both at high level.

Figure 5:
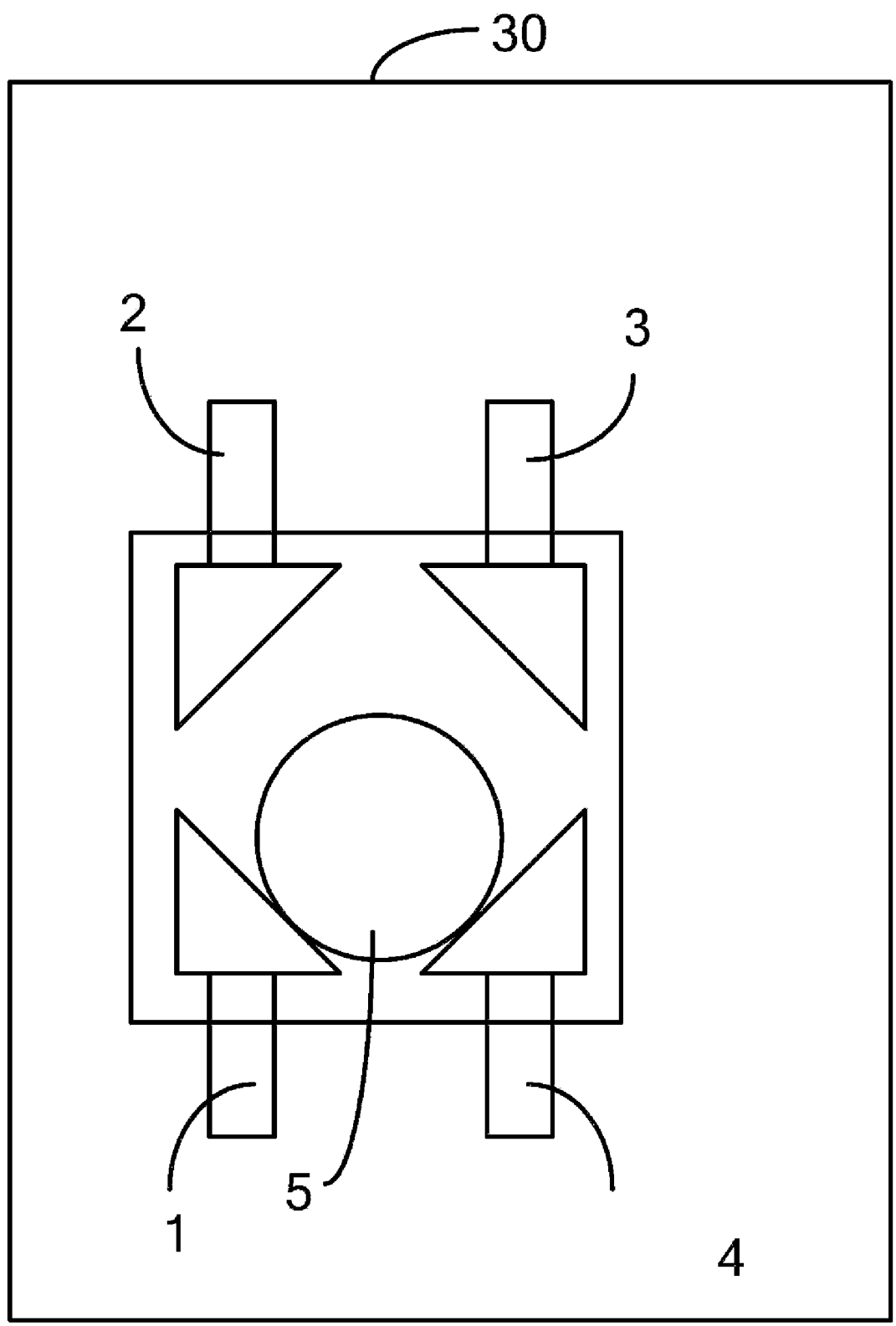
FIG. 5 illustrates the electronic device of FIG. 2 that is placed in a fourth orientation.
Figure 7:
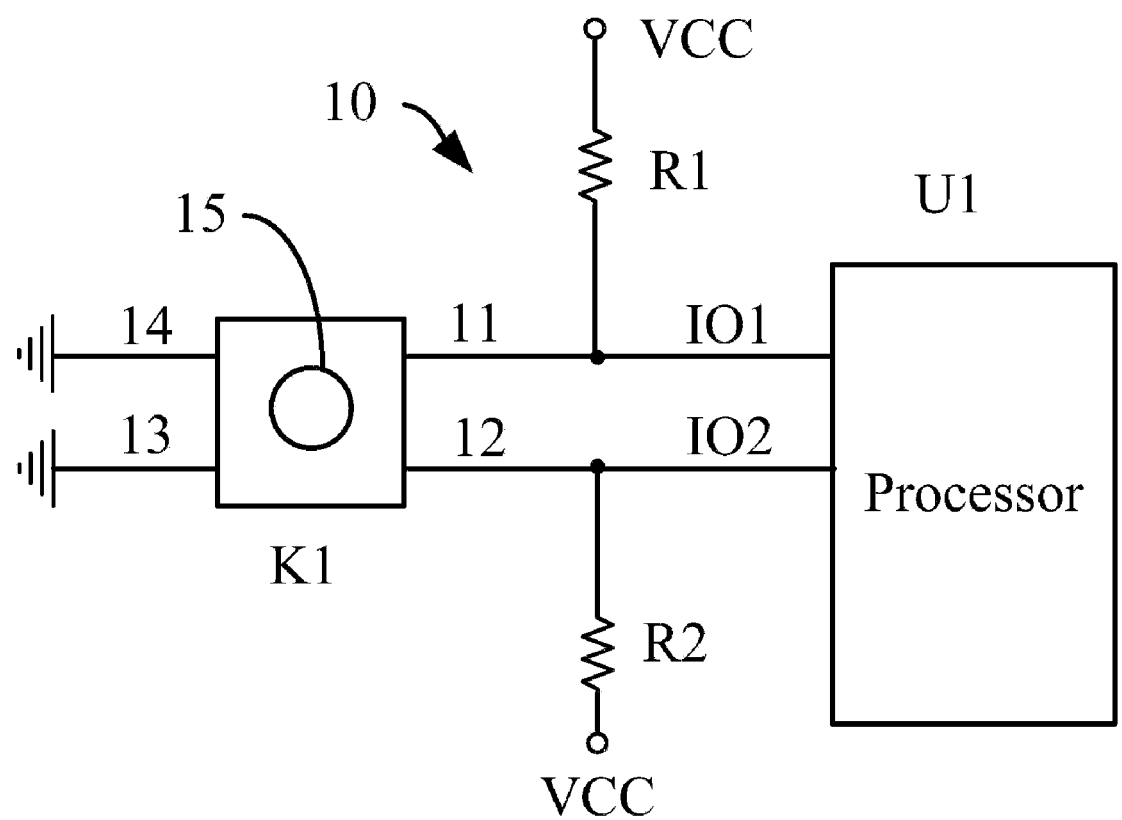
FIG. 7 shows an orientation detection circuit in the related art.

As shown in FIG. 5, the digital photo frame 30 is placed in a fourth orientation. In this circumstance, the metal ball 5 contacts the terminals 1 and 4. The pin IO1 connected to terminal 4 is thus turned to low level. The pin IO2 is connected to the ground via the resistor R13. Because the pin IO2 is at high impedance state, the pin IO2 is turned to low level. Accordingly, when the digital photo frame 30 is placed in the fourth orientation, the input signals of the pins IO1 and IO2 are both at low level.

FIG. 6 shows a relationship table stored in the processor U10. The relationship table holds definition of relationships between the output signal of the processor U10 and the input signals of the pins IO1 and IO2. For example, when the input signals of the pins IO1 and IO2 are at high level and low level, respectively, the processor U10 outputs signal S1. In the exemplary, the processor U10 includes a timer T10 for counting the duration period of the input signals. After the duration period of the input signals reaches a preset value, the processor U10 outputs corresponding controls signal.

In the example of using the orientation detection circuit 20 in the digital photo frame 30, the digital photo frame 30 includes a main processing unit (not shown) which executes an operation corresponding to the control signal from the processor U10. For example, the control signal outputted by the processor U10 can be used to keep images displayed on the screen (not shown) of the digital photo frame 30 to be upright. Specifically, the digital photo frame 30 is normally placed in the first orientation and the image displayed on the screen is upright. When the digital photo frame 30 is placed in another orientation, for example, in the third orientation, the image is then rotated 180 degrees based on the control signal, which indicates the digital photo frame 30 is placed in the third orientation, thereby maintaining the image to be upright to users.

While one embodiment has been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An orientation detection circuit comprising:
   a processor comprising a first input pin and a second input pin;
   a first resistor;
   a second resistor;
   a third resistor having a resistance value greater than that of the first resistor and the second resistor;
   a vibration switch comprising a first terminal being grounded, a second terminal connected to the second input pin, a third terminal connected to a power source, a fourth terminal connected via the third resistor to the second terminal and connected to the first input pin, and a conductive ball configured for simultaneously contacting two of the terminals;
   a first transistor having a first source connected via the first resistor to the power source, a first drain connected to the first input pin, and a first gate connected to the second input pin;
   a second transistor having a second source being grounded via the second resistor, a second drain connected to the first input pin, and a second gate connected to the second input pin;
   wherein, the processor identifies signals from the first input pin and the second input pin and outputs a corresponding control signal.

2. The orientation detection circuit according to claim 1, wherein the first transistor is a p-channel enhancement-mode MOSFET, and the second transistor is an n-channel depletion-mode MOSFET.

3. The orientation detection circuit according to claim 1, wherein the first transistor and the second transistor are junction FETs.

4. The orientation detection circuit according to claim 1, wherein the processor comprises a timer for counting a duration period of the signals of the first input pin and the second input pin, and the processer outputs the control signal after the duration period reaches a preset value.

5. The orientation detection circuit according to claim 1, wherein the first resistor and the second resistor have a resistance value of 10 k ohms, and the resistance value of the third resistor is 100 k ohms.

6. An electronic device comprising:
   a main processing unit;
   an orientation circuit comprising:
      a processor comprising a first input pin and a second input pin;
      a first resistor;
      a second resistor;
      a third resistor having a resistance value greater than that of the first resistor and the third resistor;
      a vibration switch comprising a first terminal being grounded, a second terminal connected to the second input pin, a third terminal connected to a power source, a fourth terminal connected via the third resistor to the second terminal and connected to the first input pin, and a conductive ball configured for simultaneously contacting two of the terminals;
      a first transistor having a first source connected via the first resistor to the power source, a first drain connected to the first input pin, and a first gate connected to the second input pin;
      a second transistor having a second source being grounded via the second resistor, a second drain connected to the first input pin, and a second gate connected to the second input pin;
      wherein, the processor identifies signals from the first input pin and the second input pin and outputs a corresponding control signal;
   wherein, the main processing unit is configured for executing operations according to the control signals from the orientation detection circuit.

7. The electronic device according to claim 6, wherein the first transistor is a p-channel enhancement-mode MOSFET, and the second transistor is an n-channel depletion-mode MOSFET.

8. The electronic device according to claim 6, wherein the first transistor and the second transistor are junction FETs.

9. The electronic device according to claim 6, wherein the processor comprises a timer for counting a duration period of the signals of the first input pin and the second input pin, and the processer outputs the control signal after the duration period reaches a preset value.

10. The electronic device according to claim 6, wherein the first resistor and the second resistor have a resistance value of 10 k ohms, and the resistance value of the third resistor is 100 k ohms.

11. The electronic device according to claim 6 being a digital photo frame.

* * * * *